Oct. 11, 1966 E. A. PETERSON ETAL 3,277,505
MACHINE FOR MAKING CASINGS FOR BOOKS
Filed Dec. 29, 1964 9 Sheets-Sheet 1

INVENTORS
EVERETT A. PETERSON
HAROLD W. PETERSON

BY

ATTORNEY

Oct. 11, 1966     E. A. PETERSON ETAL     3,277,505
MACHINE FOR MAKING CASINGS FOR BOOKS
Filed Dec. 29, 1964     9 Sheets-Sheet 2
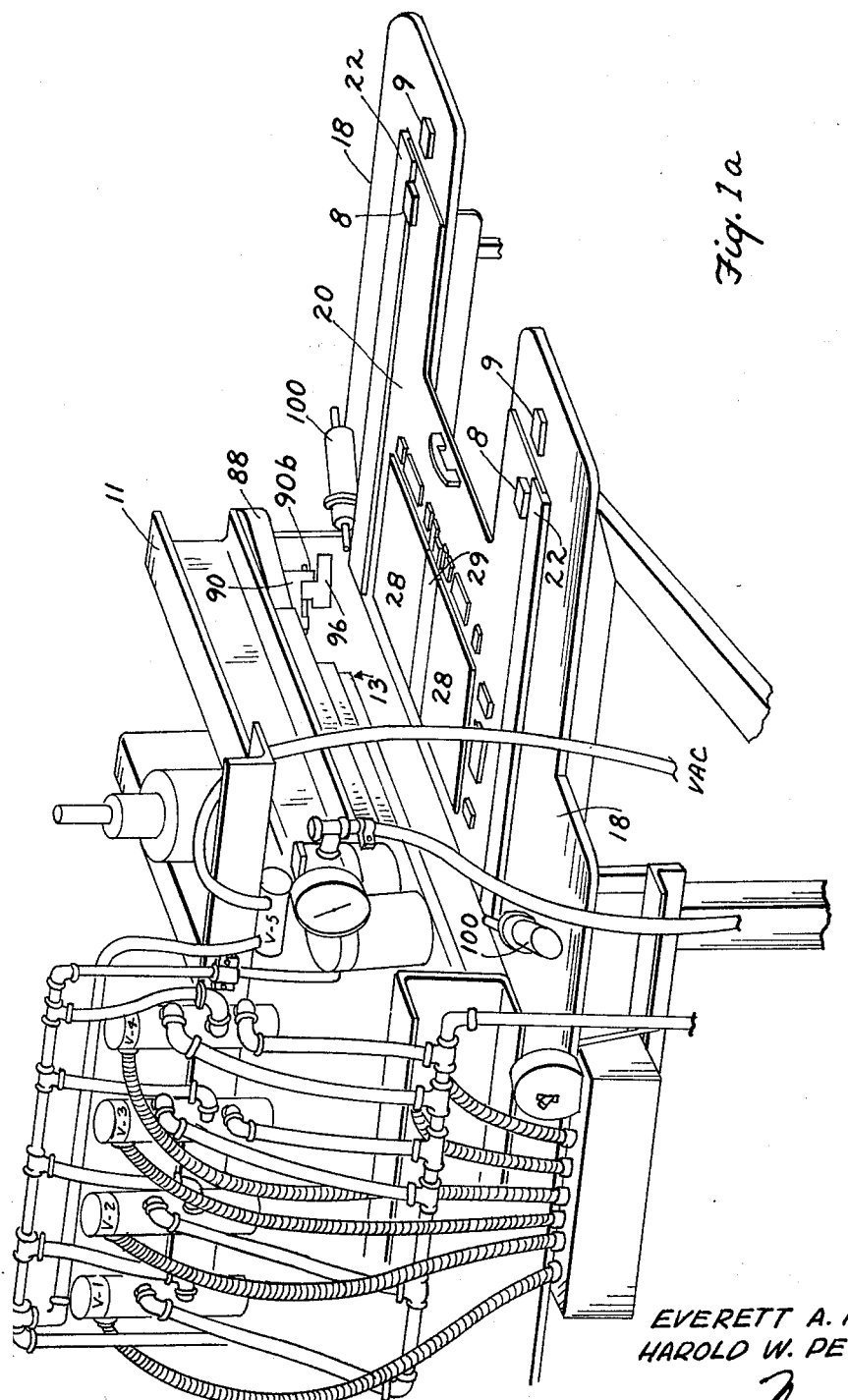
INVENTORS
EVERETT A. PETERSON
HAROLD W. PETERSON
BY
ATTORNEY

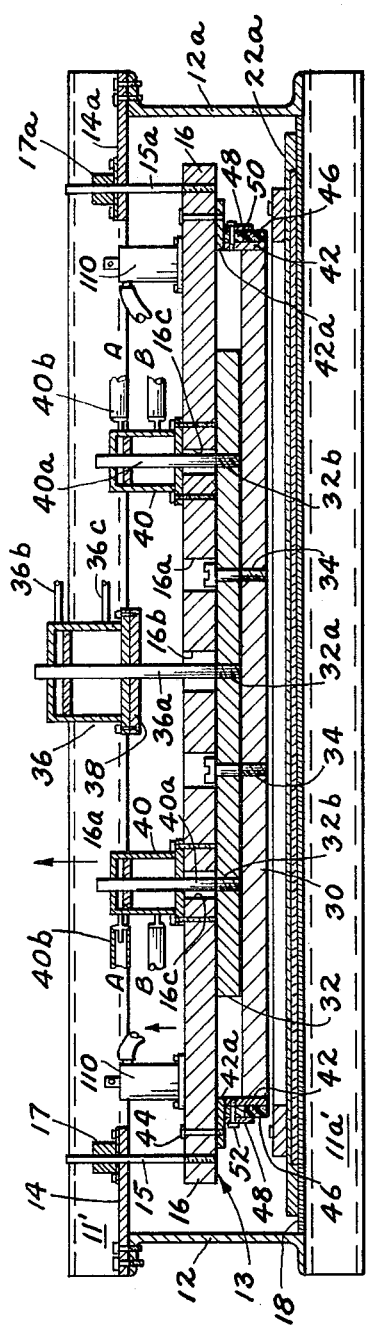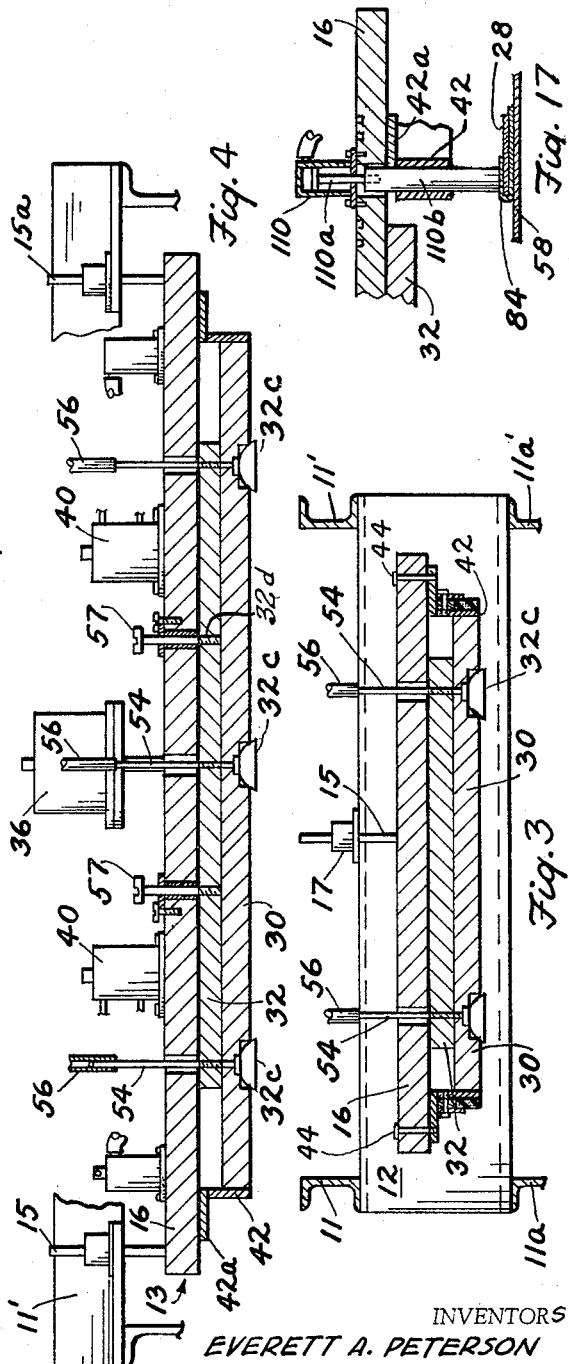

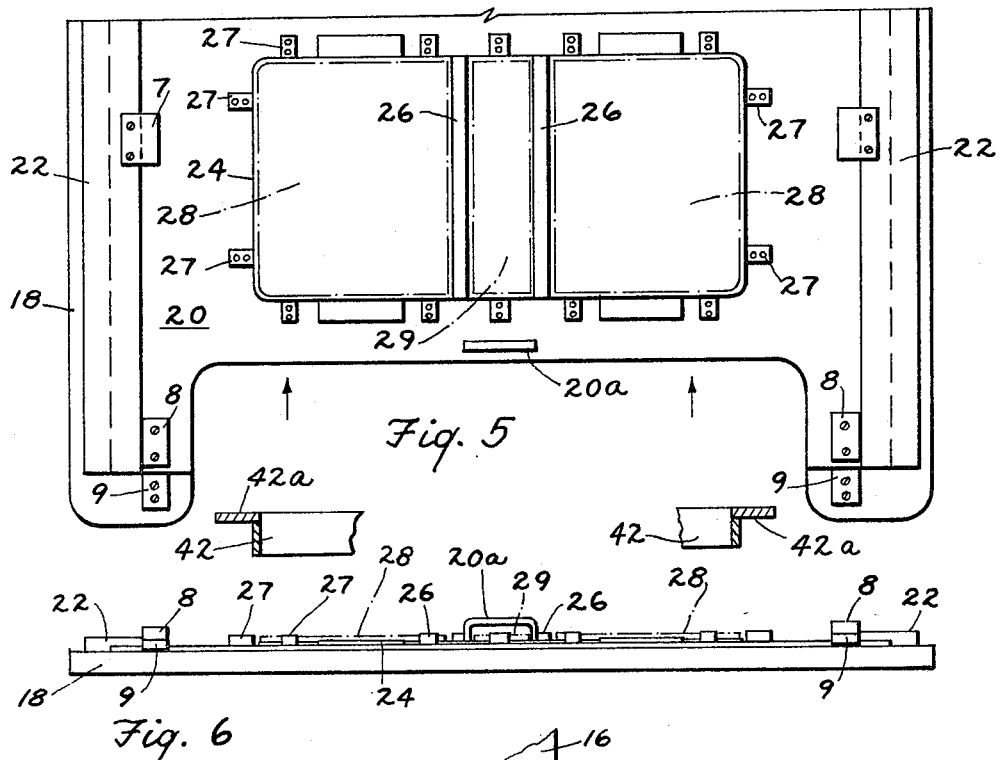
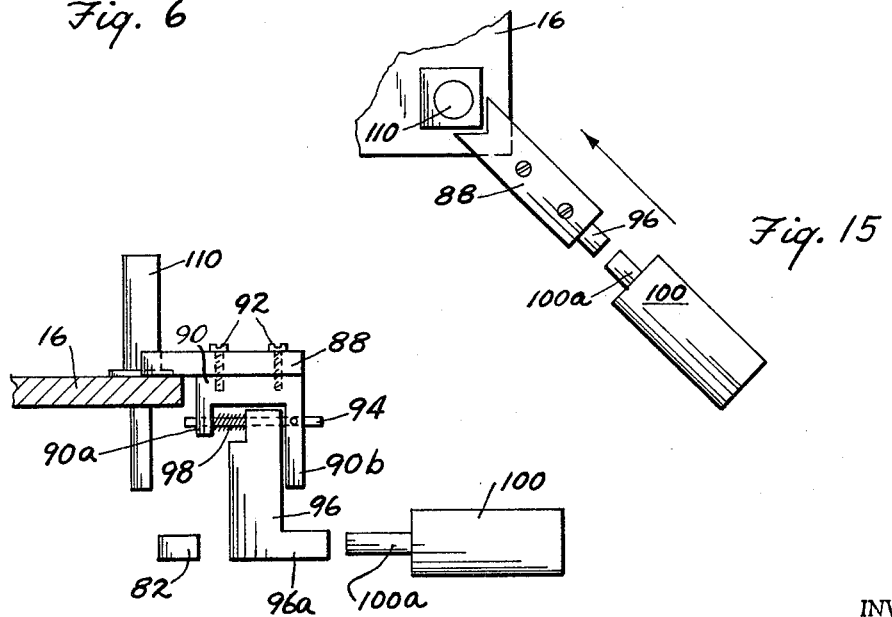

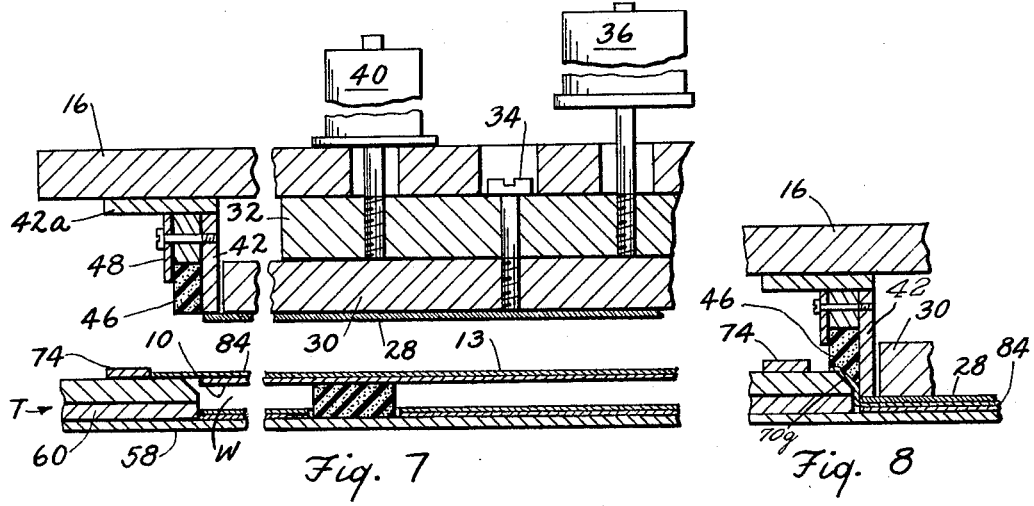
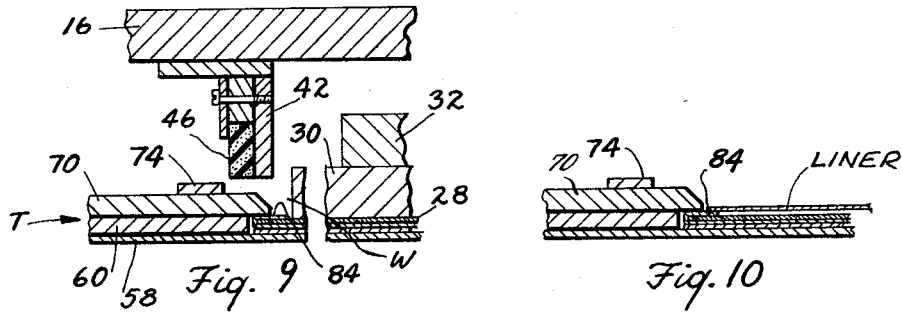
Fig. 25
CYLINDER 36 (2" TRAVEL) CAM 1
CYLINDERS 40 (½" TRAVEL) CAM 2
    RELAY 2
    VAC. OFF
CYLINDERS 100 (½" TRAVEL) CAM 3
    4 CLAMP
    ARM PISTONS
CYLINDERS 110 (½" TRAVEL) CAM 4
    4 STRIKING
    PISTONS
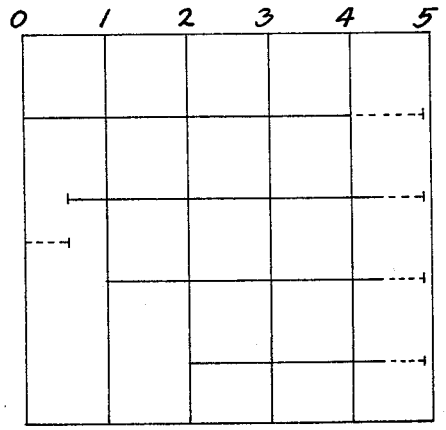

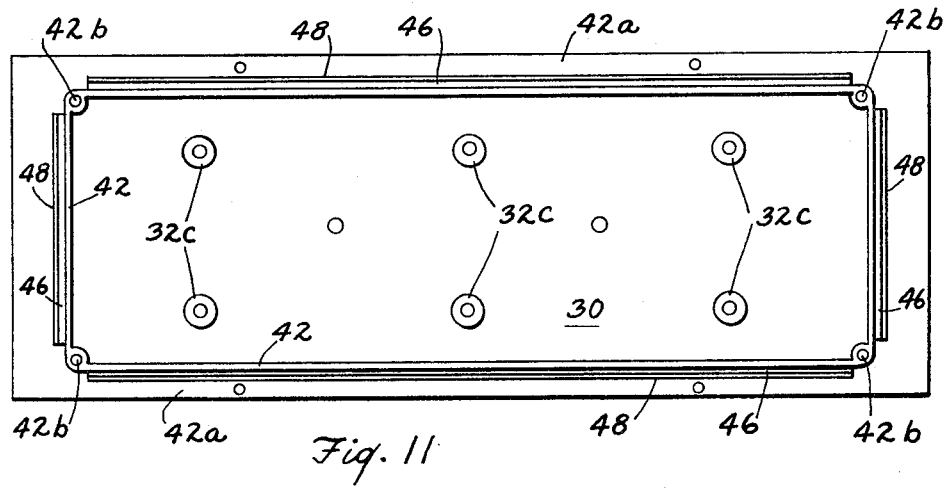
Fig. 11
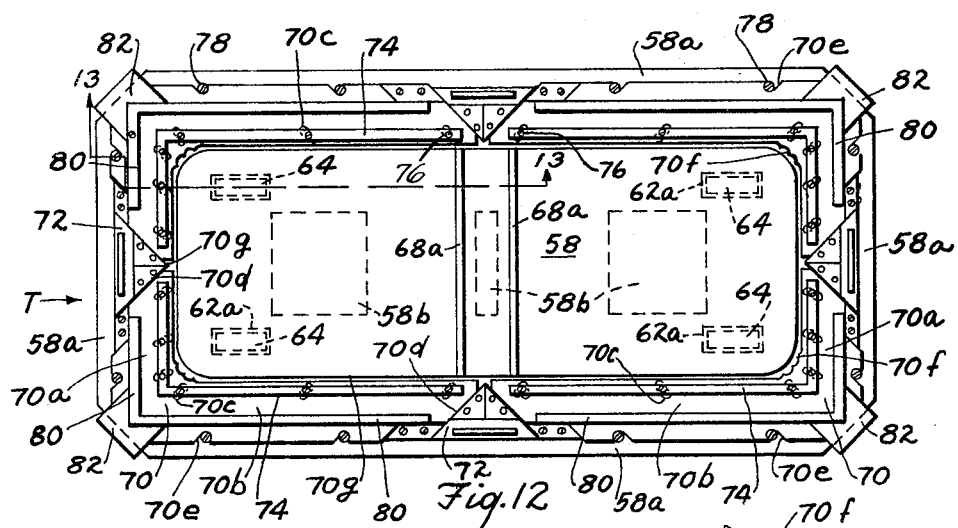
Fig. 12
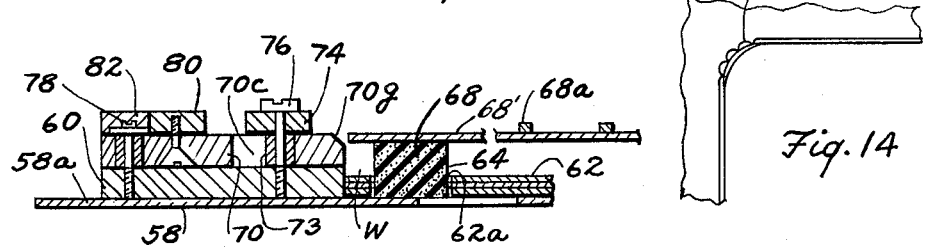
Fig. 13
Fig. 14
INVENTORS
EVERETT A. PETERSON
HAROLD W. PETERSON
BY
ATTORNEY

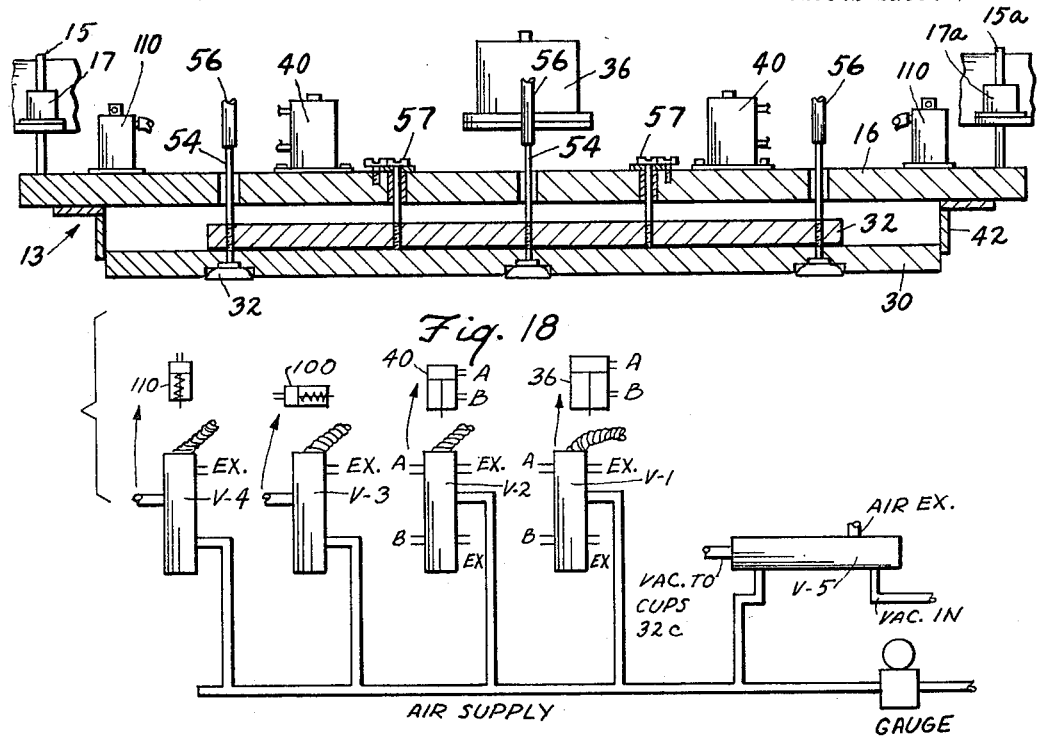
Fig. 18
Fig. 19
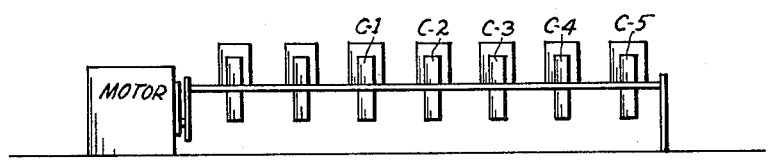
Fig. 20

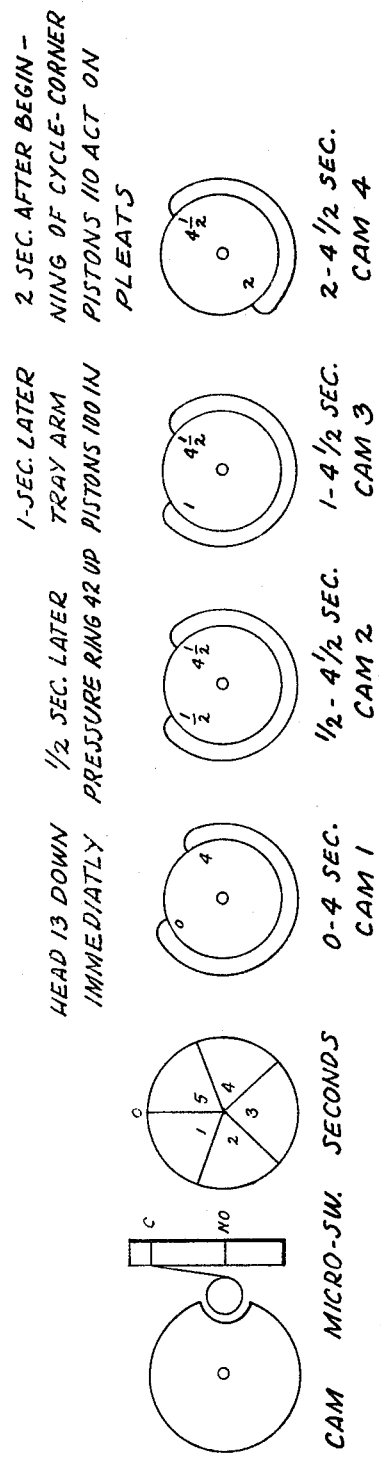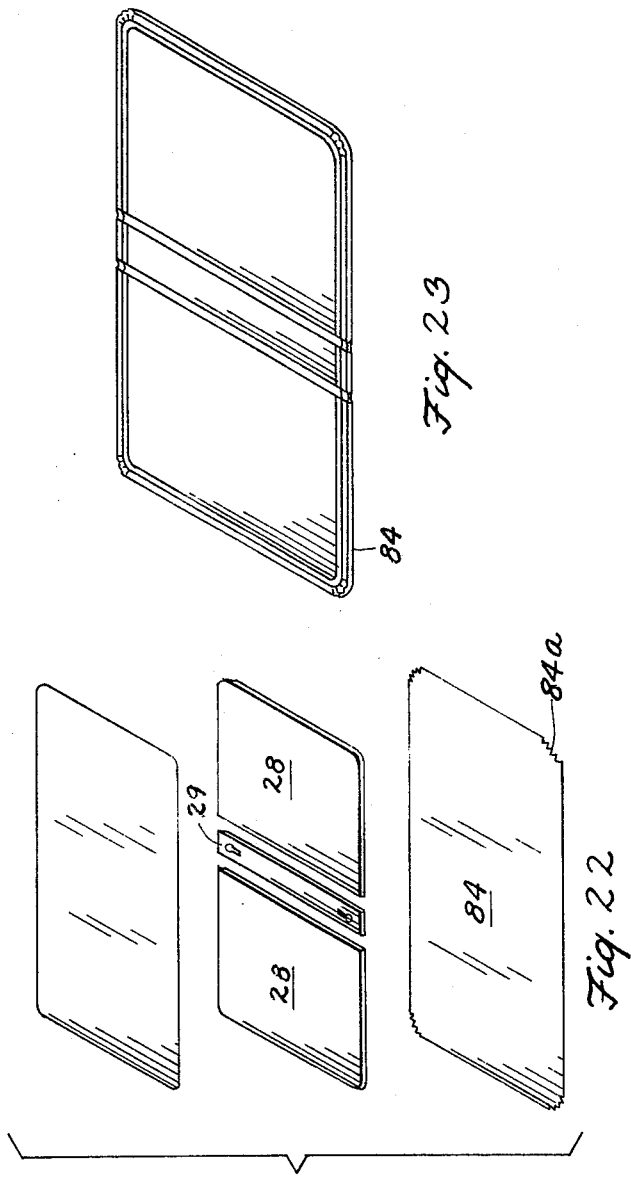

INVENTORS
EVERETT A. PETERSON
HAROLD W. PETERSON

ATTORNEY

United States Patent Office 3,277,505
Patented Oct. 11, 1966

3,277,505
MACHINE FOR MAKING CASINGS FOR BOOKS
Everett A. Peterson, Roslyn Heights, and Harold W. Peterson, Roslyn, N.Y., assignors to Peterson Electronic Die Co., Inc., Mineola, N.Y., a corporation of New Jersey
Filed Dec. 29, 1964, Ser. No. 421,932
20 Claims. (Cl. 11—2)

This invention relates to a machine for and a method of preparing a casing for a book. In preparing a casing for a book of the type having a backbone, it is customary to provide cardboard or chipboard stays or stiffeners for each side of the book, with a backbone of the same material disposed between said side boards, but slightly spaced from them, the space between said boards forming the hinge for the side covers, after said covers have been applied. Covers have been applied to said boards in various ways, and since the advent of thermoplastic materials, it has become fairly common practice to apply a sheet of such materials to each face of the cover board assembly and to weld them together by radio or high frequency around the peripheral edges of said boards, the seal or weld taking effect between the contacting faces of said thermoplastic outside the peripheral edges of said side boards and backbone, forming what is known in the trade as a "tear" seal. A tear seal is formed when the outer marginal portion around the weld or die impression is torn away at said weld or die impression, leaving a rough, sharp and uneven edge exposed. Thus, the tear seal not only has the stated disadvantages, but it is also wasteful of the material which is torn away and discarded. Further, because of these disadvantages, it is neither a satisfactory nor a final solution to the problems created by using thermoplastic materials as covers for books. To date, however, no one has presented a satisfactory solution which eliminates the tear seal yet preserves the advantages of using thermoplastic cover materials for book bindings.

The principal object of the present invention is to overcome the foregoing difficulties and disadvantages and to provide a novel machine and method for producing a casing or cover for a book, looseleaf, edition, or otherwise, which uses thermoplastic materials for the cover sheets, but which combines them with the coverboard stays or stiffeners in a novel manner, on a mass production basis, without the use of the tear seal.

This is accomplished, according to the invention, by assembling the cover components, i.e., the thermoplastic inner and outer cover sheets and the cover stays, including the backbone therefor, into their respective, permanent positions, by mechanical means at a high rate of speed. The casing so produced has been described and claimed in application Serial No. 350,932, filed February 18, 1964.

The present invention overcomes the foregoing disadvantages of the tear seal casing by turning the outer thermoplastic cover sheet over the adjacent edges of the coverboards and backbone, so that the inner thermoplastic liner sheet can be applied to said turned edge and secured thereto, by welding. The turning of the edge is accomplished by mechanical means in a novel manner which also accomplishes a pleating of the corners of the material as it is turned over the edge, giving the corners a rounded, neat and flat appearance.

Other objects and purposes of the invention will become apparent from the accompanying description taken in connection with the drawings illustrating a practical embodiment of the invention, and in which FIGURE 1 is a plan view of the machine with parts removed for clarity of exposition.

FIGURE 2 is a longitudinal cross section taken along the line 2—2 of FIGURE 1.

FIGURE 3 is a transverse cross section taken along the line 3—3 of FIGURE 1.

FIGURE 4 is a transverse cross section taken along the line 4—4 of FIGURE 1.

FIGURE 5 is an enlarged detail plan of the forward portion of the table of the machine, showing a set of book stays in position prior to insertion into the machine.

FIGURE 6 is an elevation taken in the direction of the arrows in FIGURE 5, showing the relationship of the pressure ring to the back stays.

FIGURE 7 is a sectional detail showing a preliminary step in the assembly of the stays and their cover sheet.

FIGURE 8 is a sectional detail showing a further step in the assembly.

FIGURE 9 is still a further sectional detail of a further step in the assembly of the parts.

FIGURE 10 is a detail showing the final assembly of the outer cover sheet to the stay, with the inner liner applied prior to welding.

FIGURE 11 is a bottom plan view of the pressure plate.

FIGURE 12 is a plan view of the clamping jig or tray in which the stays and cover sheets and liners are assembled.

FIGURE 13 is a sectional detail taken along the line 13—13 of the tray of FIGURE 12.

FIGURE 14 is a detail in plan view of a corner portion of the tray of FIGURE 12.

FIGURE 15 is a detail in plan view of the piston and mechanism for operating the clamping members of the jig or tray.

FIGURE 16 is an elevation of the same.

FIGURE 17 is a sectional detail of the corner piston passing through a corner of the pressure ring to flatten the pleats on a corner of the assembled cover sheet and stay.

FIGURE 18 is a sectional detail similar to FIGURE 3, showing the pressure ring raised with respect to the pressure plate.

FIGURE 19 is a diagrammatic view showing the relationship of the respective solenoids and air cylinders.

FIGURE 20 is an elevation of the cam motor, cams and microswitches controlled by the said cams.

FIGURE 21 is a diagram of the cams showing their time relationship.

FIGURE 22 is an exploded view of the several components of the casing.

FIGURE 23 is a perspective view of a finished casing.

FIGURE 25 is a time sequence chart of the operation of the machine.

Figure 1:
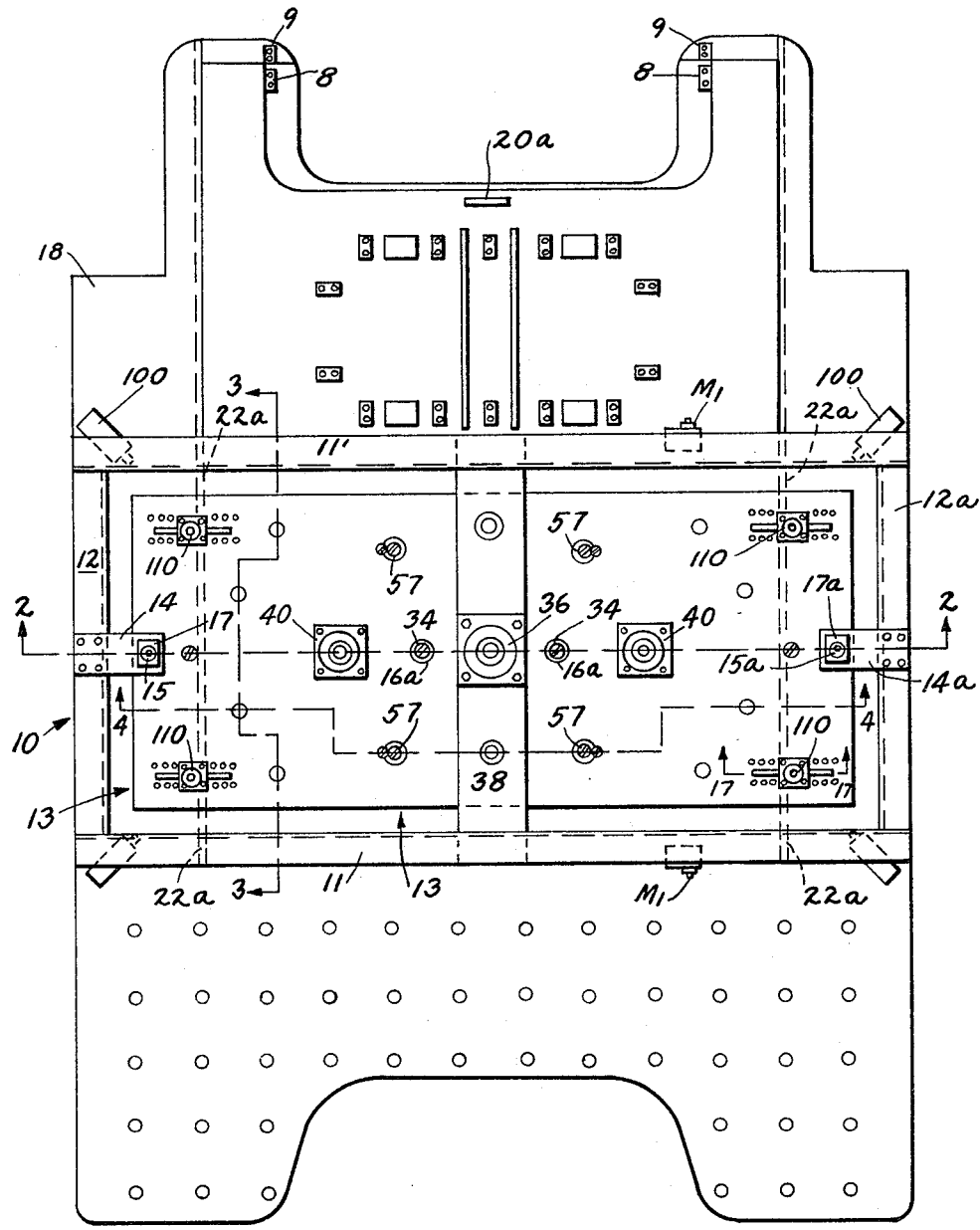
FIGURE 1a is a front perspective view of the machine and forward table.

The machine of this invention comprises a generally rectangular frame 10 in plan view (FIGURE 1) having spaced longitudinal structural members such as upper and lower channels 11, 11' and 11a, 11a' respectively, joined together by intermediate end, transverse members such as channels 12, 12a. A reciprocating head, generally denoting an assembly indicated by 13, FIGURE 2, is mounted for reciprocating vertical motion within said frame. Said head is guided by spaced arms 14, 14a secured to the top of the transverse members 12, 12a, said arms extending inwardly of the frame, the head being suspended from said arms by bolts 15, 15a extending through said arms and being attached to a plate 16. The bolts are guided vertically by bearing members 17, 17a, respectively, fixed to the plates 14, 14a. The head is supported by the piston rod 36a, as will be explained.

A table 18, FIGURES 1 and 5, is supported below the head 13 and extends across the structural members 11a, 11a', the table extending forwardly and rearwardly of the sides of the machine. A sliding plate 20 having an operating handle 20a is mounted to slide on said table in rabbeted guides 22 fixed to the table at each side of said plate. Centrally disposed on the plate 20 is a jig comprising a plate 24, FIGURES 5 and 6, having raised, spaced, divider ribs 26, the space on said plate between said dividers being equal to the dimensions of the backbone 29 of a book, the space on said plate on each side of the backbone being equal to the dimensions of the coverboard stiffeners 28 of a book. The plate 24 is rigidly fixed in position on the sliding plate 20 by a series of peripherally placed stop members 27 which are suitably secured to the sliding plate 20.

Rabbeted guides 22a, FIGURE 1, in extension of the guides 22 are fixed to the table 18 under the head 13, so that when a pair of coverboard stays or stiffeners 28 and a backbone stay or stiffener 29 are placed over the plate 24 and pushed into the machine, they will lie directly in registry, under the head 13. Fixed stop blocks 7, on the guide 22, blocks 8 on the sliding plate 20, and fixed blocks 9 on the table 18, mark the forward and rearward limits of travel of the plate 20 to accomplish this purpose.

The head 13, FIGURE 2, comprises the upper plate 16, a lower, pressure plate 30, and an intermediate pressure tie-plate 32. The latter two plates are tied together by bolts 34, the heads of these bolts being accommodated in the holes 16a provided therefor in the upper plate 16. The entire head assembly is supported in the frame and is reciprocated therein by means of a centrally disposed air cylinder 36, which is supported on a heavy crossbar 38, the cross bar being fixedly secured to the flanges on the underside of the upper longitudinal channels 11, 11'. The piston rod 36a of the air cylinder extends downwardly through a hole 16b in the plate 16 and is threaded into a tapped hole 32a in the plate 32.

A pair of air cylinders 40, of lesser capacity than that of the cylinder 36, are fixedly mounted on the plate 16, spaced 180° from each other, one on each side of the cylinder 36. Each of these two cylinders has its piston rod 40a extending through holes 16c in the plate 16, the end of the rod being threaded into a tapped socket 32b in the tie-plate 32.

A rigid pressure ring 42, FIGURES 7 and 11, is closely fitted around the periphery of the pressure plate 30, but slidingly movable with respect thereto, the ring having an upper flange 42a which is secured to the plate 16 by bolts 44. A supplementary, yieldable pressure member 46, FIGURES 7 and 11, is fitted to the outer walls of said ring by means of a clamping plate 48, spaced from the ring 42 by means of spacer 50, the clamping plate being secured to the ring by screws 52. As shown in the bottom plan view of the pressure ring 42, FIGURE 11, it has four corner sockets 42b for the reception of pressure pins 110b which will hereinafter be described.

The pressure plate 30 is provided on its bottom face with a series of flexible vacuum cups 32c, FIGURES 3, 4 and 11, which are connected by tubes 54 extending through the several plates of the head, with conduits or hoses 56, leading to a source of vacuum, as will be described.

In operating the machine to make a case for a book, a pair of cover board stiffeners or stays 28, FIGURES 5 and 6, are placed on the plate 24, FIGURES 5 and 6, one on the outer side of each divider rib 26, and a backbone stiffener or stay 29 is placed between said divider ribs, the stays being locked in position by the peripherally disposed stop members 27. The sliding plate 20, by means of the handle 20a, is moved manually by sliding it in its guides 22 under the head 13, where stop members (not shown) position it so that the peripheral edges of the stay members are exactly vertically aligned and in registry with the outer periphery of the pressure ring 42, which is supported directly overhead, as diagrammatically shown in FIGURE 6.

Air under pressure is now admitted to the upper side of the piston in cylinder 36 through inlet port 36b forcing the piston downwardly, simultaneously carrying with it the three plates 30, 32 and 16, until the plate 30 rests directly upon the stays beneath it. As the head 13 (comprising the said plates 30, 32 and 16) moves downwardly, suction is applied to the vacuum cups 32c which grip the stays 28, 29 at the bottom of the stroke so that they are firmly fastened to the bottom of the pressure plate 30, FIGURE 7, at which time air to the upper part of cylinder 36 is cut off. The head assembly and the stays are now lifted by exhausting the air from the upper side of cylinder 36 and admitting air to the lower side of the piston through the inlet 36c.

While the stays are thus held in their relative position by the head 13, the outer cover 84 is now applied in the following manner. A clamping jig or tray T is provided, FIGURE 12, comprising a base plate 58, preferably of aluminum, and a rectangular frame 60, FIGURE 13, preferably of a Bakelite or some other suitable material, is fastened to the said frame in such a manner that a marginal portion 58a of the base plate is provided completely around said frame, the interior of said frame having a well W with dimensions of length and width substantially coinciding with the overall dimensions of the stays as held by the pressure plate 30. The base plate is provided with openings 58b, FIGURE 12, in its body, these openings coinciding substantially with a central portion of the stays 28, 29 as they are held by the pressure plate, the openings 30 being provided to eliminate or reduce warping of plate 58. Seated in the base of the well and lying over the base plate 58 are a number of thickness or spacer plates 62, FIGURE 13, each of which has four symmetrically arranged coinciding openings 62a, FIGURES 12, 13, to receive yieldable inserts, such as sponge or foam rubber or the like, 68, which are secured to the base plate 58 above and below the openings corresponding to the position held by the stays 28 on the pressure plate 30. Placed over these thickness plates 62, and spaced therefrom by the sponge rubber inserts 64, is a further plate 68', fitting snugly within the well W of the frame 60, and likewise having an overall dimension corresponding to the overall dimensions of the stays 28, 29, as supported by the pressure plate 30. The plate 68' is provided with raised, centrally disposed, parallel and spaced ribs 68a, these ribs being positioned so as to coincide with the spaces between said stays 28, 29 as they are held by the pressure plate 30. The height of the rubber inserts is such that they support the plate 68' so that its upper surface lies on a plane substantially coincident with the plane of the upper surface of the clamping member 70, FIGURE 13, about to be described.

A sliding clamping member 70 of the jig or tray T is positioned over the rectangular frame 60 at each corner thereof. Each clamping member comprises an angular sliding member having a short arm 70a and a long arm 70b. The clamping member 70 is provided with diagonal slots 70c, and the free end of each arm is cut off at an angle as at 70d, the angle of the slots and the angle of the ends of said arms being substantially the same. Each clamping member 70 is guided in its sliding movements by triangular end blocks or guides 72 suitably secured to the frame 60 by screws. Each clamping member is further supported and guided by an angular strip 74 positioned over the clamping member 70 and supported thereover by screws 76 which are threadedly engaged with the frame 60. The screws which secure the clamping member have nylon bushings 73 to facilitate the sliding movement of the clamping member with respect to said screws. These screws are tightened just enough to permit the sliding clamping member to slide between the strip 74 and the frame 60. At its outer edges, the clamping member 70 is provided with diagonal slots 70e which accommodate nylon bushed screws 78 to guide same in the reciprocating, sliding movements of the clamping member. Each clamping member is provided with corresponding angular reinforcing and stiffening ribs 80, backed by a corner block or shock absorbing member 82, where the two arms of said ribs intersect. The purpose of the corner blocks will hereinafter appear. The interior angle of the clamp-member, where the short and long arms intersect, is rounded and has its surface notched out or grooved as at 70f, on said rounded portion, FIGURES 12 and 14, for a purpose which will appear as the description proceeds, and the inner upper edge of each arm of the clamping member is slightly bevelled, as shown at 70g, FIGURE 13, also for a reason which will appear.

The sheet of the outer covering material 84 for the casing having its corners rounded and pinked or notched, as at 84a, FIGURE 22 is now arranged within the well W, over the plate 68', with its edges coinciding with and confined by the strips 74, the inner face of the sheet, or that face which will be brought into contact with the bottoms of the stays 28, 29, lying face upward.

We return now to the head 13, FIGURE 7, which is being held in its upper position, with the stays 28, 29 adhered to the pressure plate 30 by suction. The tray T bearing the cover sheet 84 as described is now inserted under the head 13 from the side opposite to that from which the stays were inserted, the marginal portions 58a on each side of the base of the tray engaging the rabbeted guides 22a under the head 13. The leading edge of the tray engages the leading edge of the plate 20 and pushes the latter back to its original position, stopped by the meeting of the edges of plate 20 and blocks 9. This positions the tray T under the pressure plate 30, with the cover sheet arranged in perfect registry with and in a position to receive the stays 28, 29, in their proper permanent relationship with respect thereto.

Air is again admitted to the upper side of the cylinder 36, forcing the piston down and lowering the entire head 13, with its stays on to the cover material 84 in the tray, the pressure plate 30 and the pressure ring 43 entering the well in the tray T, FIGURE 8, positioning the backbone stay 29 over the sheet 84 and between the ribs 68a, (not shown in FIGURE 8), and positioning the cover stays 28, one each, over the cover sheet on each side of the ribs 68a.

The pressure of the entire head 13 forces these stays and the cover sheet down into the well of the tray T, compressing the sponge rubber inserts 64, the thickness plates 62 allowing the plate 68 to go down just far enough to permit its upper surface to lie in substantially the same plane as the upper surface of the frame 60, FIGURE 13. The outside dimensions of the pressure ring 42 are so carefully calculated and established with respect to the walls of the well that just sufficient space between them is allowed to accommodate the thickness of the sheet 84 with a tight fit. Thus, when the ring 42 and the plate 30 descend into the tray, they tend to stretch the sheet, FIGURE 8, pulling it between the bevelled edges 70g of the clamping members and the yieldable member 46, the corner notches 70f, FIGURE 14, tending to form corrugations or pleats in the notched corners of the cover sheet 84, as said corners are shifted from a substantially horizontal position, FIGURE 7, above the well to an inclined position in respect of the edges of the well, FIGURE 8, between the pressure ring 42, the yieldable member 46 and the walls of the well. During this pressing operation, the resilient clamping members 46 around the periphery of the pressure ring act on the edges of the cover sheet to add to the tension on said sheet evenly on all sides, and to increase the amount of stretching of the sheet to insure that it will lie smoothly and flatly against the corner stays 28 and backbone 29, without wrinkling.

Since the head 13 is now in its lowest position and cannot move further downward, being so held by air pressure in cylinder 36, the air subsequently admitted to the cylinders 40 acts on the casing of said cylinders to raise the casings with respect to their pistons, FIGURE 18, the latter remaining stationary. This has the effect of raising the plate 16 with respect to the intermediate plate 32, creating a space between them. During this movement, the pressure ring 42 is also lifted a short distance along the peripheral walls of the pressure plate 30, the slight upward movement of the pressure ring and plate 16 with respect to the pressure plate 30 being stopped when the top of the plate 16 engages the underside of the heads of the bolts or pins 57, FIGURE 18. At this time in the operating cycle, the suction in the pressure plate 30 against the stays (still in the well) is now released. The air is thereupon exhausted from the upper part of the cylinder 36 and is admitted to the lower portion of said cylinder to start the lifting movement of the pressure plate 30 out of the well. As the bottom of the pressure plate 30 clears the top of the clamping arms 70, said clamping arms are operated in the manner about to be described.

Meanwhile, air is exhausted from the upper portion of the cylinders 40 and is admitted to the lower portions thereof, the piston in the cylinder 36 during this time continuing to move upwardly. As the bottom of the pressure plate 30 moves into the plane of the bottom of the pressure ring 42, the upper surface of the plate 32 comes into contact with the bottom surface of the plate 16 and the piston in the cylinder 40 reaches the end of its upward stroke. Meanwhile, the piston in the cylinder 36 and the head 13 are still continuing their upward movement. When the latter piston reaches the upper limit of its stroke, the head 13 has returned to its starting position, and air to the cylinder 36 is cut off. The plate 16 is guided in its upward movement by the end guides 15, 15a riding in the bearings 17, 17a and also by the four guide posts 57, FIGURES 1, 3, 18, which are headed Allen screws extending downwardly freely through holes in the plate 16 and threaded into tapped holes 32d of plate 32, FIGURE 4.

The plate 16 of the head 13 at each of its four corners, carries a support bracket 88, FIGURE 16, extending diagonally outwardly of the plate and under the channels 11, 11', the bracket being suitably secured to the plate. The bracket 88 supports a U-shaped block 90 on its underside, FIGURE 1a, the bracket having downwardly extending spaced arms 90a and 90b, the latter being the longer, the block being bolted to the support bracket 88 by means of screws 92. A rod 94 is carried by the arms 90a, 90b to support a sliding block 96 between said arms, the sliding block having an outwardly extending foot portion 96a. A compression spring 98 normally urges the block 96 to its rearward position on the rod 94. When the head 13 is in its lower position, the foot 96a of the block 96 is seated behind the corner block 82 of the tray T when the latter is in position under the head.

Behind each arm 96a of the block, a spring loaded air cylinder 100, FIGURES 1a, 15, 16 is fixed to the table 18, with the piston rods 100a of each cylinder positioned immediately to the rear of the arm 96a of the block 96, so that when the piston of said spring loaded air cylinders is actuated, it can kick said block 96 inwardly of the frame, the block hitting the corner block 82 and moving the clamping arm 70 diagonally towards the center of said tray T. The clamping arm 70 moves from the position shown in FIGURE 8 to the position shown in FIGURE 9 to turn the cover sheet 84 over the edge of the stay 28 and bring it over the upper surface of said stay.

We return now to the tray T which is still seated under the head, the latter being in its lowermost position, FIGURE 9, with the suction on the stays now released and the pressure ring 42 about to be lifted as described. The following operations take place while the pressure ring 42 is raised, but before the pressure plate 30 is raised out of the well. Air is now admitted to the spring-loaded pistons 100, FIGURES 1, 15, 16, kicking the piston rods 100a against sliding blocks 96 and urging them forward against the pressure of springs 98, the blocks hitting corner supports 82 of the tray and moving the clamping members 70 against the upstanding edges of the cover sheet to fold them over the adjacent edges of the stay members 28, 29, clamping them in this folded-over position. The clamping bars move less than one quarter of an inch and do not fully cover the folded over marginal edge of the cover sheet, FIGURES 9, 10, so that a portion of the pleated corners of the cover sheet has a tendency to project upwardly. It is necessary to flatten this to facilitate the next step in the operation. This flattening is accomplished in the following manner.

At this time four corner cylinders 110, FIGURES 1, 2, 17, are put into operation simultaneously. Each cylinder is mounted on the plate 16 in a position directly over a corner socket 42b, FIGURE 11, of the pressure ring 42. Each cylinder has a spring loaded piston with a piston rod 110a, at the extremity of which is fitted a pressure pin 110b of a diameter substantially coextensive with that of the bore of the socket 42b in each corner of the pressure ring. The plate 16 is bored to receive the piston rod which extends downwardly over said pressure ring sockets. As air is admitted to the cylinders, the pistons and piston rods are forced downwardly and the pressure pins 110b are passed through the sockets of the pressure ring 42 to strike a substantial blow on the folded-over pleated corners 84a of the cover sheet 84. The purpose of this blow is to flatten the pleated, folded-over corners so that they will hold this flattened position for a short period until the next operation. Without this blow, there would be a tendency for the corners of the cover sheet, which comprises polyvinyl chloride plastic material, to return to their former upstanding position. After the blow is struck, the piston is maintained in this position for a short period to compress the pleats, after which the air is exhausted from the piston and the spring behind it returns to its starting position, raising the pressure pins 110b. After the pressure pins have been raised, the sequence of operations, previously described for raising the pressure plate 30, are initiated.

To summarize briefly the foregoing discussion of preparing a casing for a book according to the invention, an operator places a pair of cover board stays 28 and a backbone stay 29 on the sliding plate 20 at the front of the machine, a cover stay being placed on each side of the backbone stay. The opposite, free corners of the cover stays 28 are rounded, as shown in FIGURE 22. The sliding plate is then pushed under the head 13, a series of stop members (not shown) correctly aligning said stays directly under said head. The head is brought down into contact with said stays and the suction cups engage and hold said stays to said head. The head is then raised to its initial starting position, carrying the stays with it, the stays being held by suction to the head in the respective relative positions they will occupy permanently in the finished casing.

An operator on the other side of the machine places a tray T, holding a die cut cover sheet 84 as described, on the table 18, which extends from one side of the machine to the other, and pushes this tray under the head 13, the leading edge of this tray engaging the adjacent edge of the sliding plate 20 and simultaneously pushing it from the machine until it engages the stop blocks 9. The edge of the sliding plate 20 in contact with the leading edge of the tray T forms a stop for said tray and positions it directly under the head 13, the tray being guided by the lateral guides 22 as heretofore described. The head 13 is now brought down again, placing the stays over said cover sheet 84 and forcing said stays and cover sheet into the well of the tray T, the rounded corners of the stays pressing the cover sheet 84 into the rounded corners of the tray and stretching the cover sheet as it is pressed into the well, and pleating the corners thereof against the grooved corners 70f of the tray. The pressure plate 30 is maintained in pressure contact with the stays, but the pressure ring 42 is then raised to permit the clamping arms 70 to move into clamping position over the marginal edges of the cover sheet and fold them over the upper surface of the stays, FIGURE 10. Then the corner pistons 110 are actuated to cause the pressure pins or bolts 110b to strike the pleated corners to flatten them. After the corner pressure pins are raised, the pressure plate 30 is raised and returned to its starting position, and the tray T is removed from the machine, with the cover sheet and stays held in their clamped position in the well of the tray by the clamping members 70.

An inner die cut liner for the case, likewise comprising a polyvinyl chloride plastic material, is now manually placed over the clamped stays in the well of the tray, this liner being of slightly shorter overall length and width than that of the cover sheet 84. In this position the liner is bounded on all sides, and confined against lateral movement in any direction, by the leading edges of the clamping members 70. With the relative position of the parts thus maintained in clamped position, the tray is moved to a high or radio frequency sealing press where the liner and cover sheet are welded together by a rectangular die, the weld taking effect between the contacting portions of said sheets, the leading or inner edges of the clamping members 70 defining the outer peripheral limits of said die.

A weld is thus made on a marginal portion of the upper or inner surface of the casing adjacent its periphery. The assembled casing is now removed from the tray and transferred to another sealing press where a seal is made along the hinge portions of the casing, the inner liner and the outer cover sheet being welded together in the space between each cover stay 28 and the adjacent backbone 29. The casing is now finished and is ready to be bound up into a book or to be provided with rings for a loose leaf binder. While, as mentioned above, the peripheral seal and the hinge seal for the binder or casing were made by separate dies, in separate presses, it is entirely practical and feasible to make both seals in one operation, by one die. The operation of applying the outer cover to the stays as described herein takes approximately four and one half seconds.

The mechanical operations have heretofore been described for the sake of convenience and simplicity without detailed reference to the electrical and air devices and the controls therefor which direct the operations of the machine, all of which are performed automatically, as will now be described.

Figure 24:
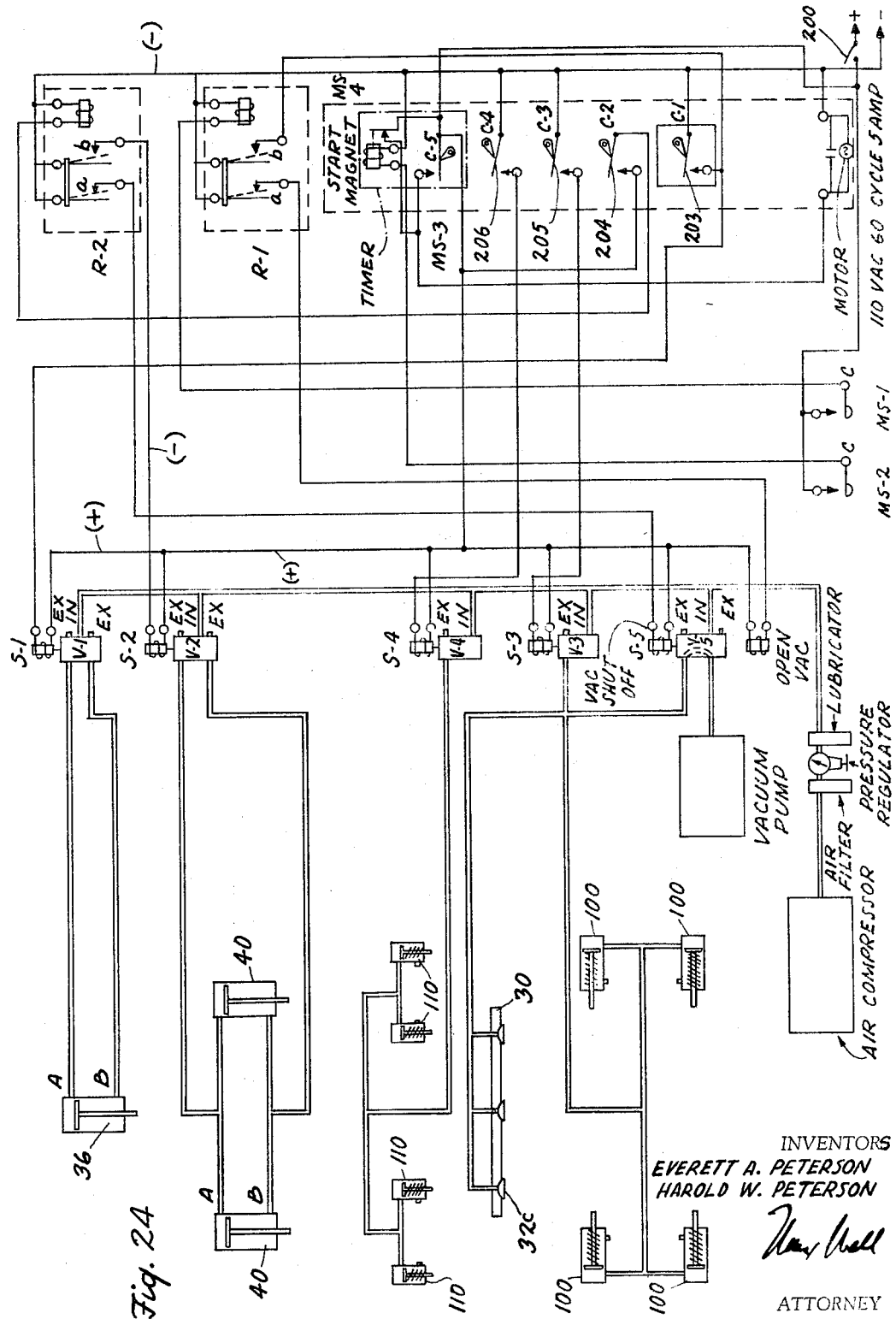
FIGURE 24 is a diagram of the electrical and pneumatic circuits for the machine.

FIGURE 24 is a schematic diagram of the electrical and pneumatic circuitry for control and actuation of the machine. The arrangement is of a conventional nature and utilizes a commercial timer mechanism, so designated, which effects a single rotation of a plurality of cams carried on a shaft and rotated by a motor, so designated, all being part of the timer mechanism. Thus, the timing cams C–1, C–2, C–3 and C–4 control the phasing of the various power pneumatic cylinders 36, 40, 100 and 110, which effect the functions previously described. The cam layouts are shown in FIGURE 21.

A fifth cam C–5 is part of the timer mechanism, a commercially obtainable unit. The cams C–1 through C–4 actuate conventional commercial switches designated, respectively, 203, 204, 205 and 206. These switches control current to various solenoids S–1, S–2, S–3, S–4 and S–5, which effect the opening and closing of respective valves V–1, V–2, V–3, V–4 and V–5, all of conventional, commercially obtainable structure and well known in the art. The valves are of a multiway type and the valve V–5 has two solenoids, designated as A and B, for control of suction through the suction cups 32c. The valves V–1 and V–2 control air pressure flow and exhaust for both ends of cylinders 36 and 40, respectively. The valves V–3 and V–4 control pressure air only through one end of the cylinders 100 and 110, respectively, inasmuch as the pistons of the cylinders are provided with spring return and do not require air pressure for the return stroke. A vacuum pump, so designated, provides suction for the suction cups while an air compressor, so designated, provides air pressure for power actuation of the several cylinders.

An overall power control switch 200 effects connection to a 110 volt A.C. power line, the terminals being designated with plus and minus signs in order to render convenient the tracing of the several circuits involved. The diagram has plus and minus signs along the various leads for this purpose.

At the initiation of a cycle, the switches 203–206, inclusive, are in open position as shown.

Assuming that the stays 28, 29, have been placed on the plate 24 of the sliding support 20, FIGURE 5, an operator starts the machine by pressing the push button switch MS–1, to energize a relay R–1. This energizes the solenoid S–5a via relay contact R–1a. Thus, valve V–5 is actuated to provide a connection from the vacuum pump to the head 13 whence suction is applied to the suction cups 32c. The valve V–5 remains open for effecting suction even though switch MS–1 is released. The valve V–5 is of a type which remains open or closed at either end of travel, depending on direction of actuation, having no spring return. The closing of switch MS–1 also effects pressurizing of the cylinder 36 at the A end thereof and effects the pickup of the stays. This is accomplished by energization of solenoid S–1, via contact R–1b, which actuates valve V–1 and operates the piston of cylinder 36 to bring the head 13 down to effect pickup of the stays. Valve V–1 is a single acting, spring return type of valve which acts to pressurize the B end of cylinder 36 to raise the head when solenoid S–1 is deenergized (upon release of switch MS–1).

The operator now returns the plate 20 to its starting position for reloading. Meanwhile, an operator at the other side of the machine, who has previously loaded outside cover material 84 into the tray T, slides said tray under the head 13 up to the limit of its travel and then momentarily presses push button switch MS–2. This starts the timing cycle for the cams by energizing the motor for one revolution of the cam shaft, the cam C–5, as previously mentioned, effecting opening of the motor circuit at the end of a single revolution. Thus, cam C–5 holds open the motor control switch MS–3, but closes it when rotation starts upon momentary pressing of MS–2 which energizes the start magnet to close a shunt switch MS–4, part of the timer mechanism. Phasing of the cams and their duration of function will be noted on the time sequence chart of FIGURE 17.

Upon rotation of the cam shaft, the cam C–1 closes switch 203, holding contact at that switch for a period of four seconds. Closing of switch 203 energizes the solenoid S–1 to actuate valve V–1, again admitting pressure air at the A end of the cylinder 36, which once more brings head 13 downwardly, carrying the stays into the tray T. One-half second after closing of switch 203, the cam C–2 closes the switch 204, which likewise has a four second cycle, starting and finishing one-half second after cam C–1. The closure of switch 204 energized the solenoid of the relay R–2, having a pair of contacts a and b. Contact R–2a, upon closure, energizes the B solenoid of valve V–5 to shut off suction to the suction cups. Contact R–2b, upon closure effects energization of solenoid S–2 to actuate valve V–2, thereby pressurizing the A end of the cylinders 40, whereby pressure ring 42 is raised.

The cam C–3 closes switch 205 one-half second after the functioning of cam C–2 and holds switch 205 closed for three and one-half seconds during which time solenoid S–3 is energized to admit air via valve V–3 to the A ends of the cylinders 100. Thus, the clamping arms 70 of the tray are maintained in clamping condition for that time.

One second after cam C–3 begins its function, cam C–4 becomes functional, closing switch 206 and holding that switch closed for two and one-half seconds. During this time, solenoid S–4 is energized to admit air pressure via valve V–4 to the four corner pistons 110, thereby striking a sharp blow over the pleated corners of the cover sheet to flatten them.

At this time cam C–1 has completed its cycle one-half second before cams C–2, C–3 and C–4, which permits the head 13 to move upwardly out of the tray well. After head 13 has cleared the tray, the pistons of cylinders 40, 100 and 110 begin their return stroke to the starting position. However, owing to the relatively greater length of dwell of the cam C–1, the pistons of cylinders 40, 100 and 110 reach their starting position a quarter of a second before the piston of cylinder 36 has fully returned to its starting position. This is possible because the piston of cylinder 36 has to travel about two inches, while the other pistons travel only about one-fourth as far.

The operation of the head has been completed, and the tray with the stays and the outer cover applied over them, is now removed from the machine, the inner liner is applied and welded thereto to form the casing shown in FIGURE 23.

The invention is capable of variations in construction and design and is not to be limited to the construction shown and described for illustrative purposes only, but is to be construed in a spirit commensurate with the scope of the appended claims.

What is claimed is:

1. A machine for making casings for books of the kind having an outer cover, an inner liner, and stays supported between them, comprising means for supporting said stays in the relative positions they will occupy in the finished casing, means for simultaneously raising said stays in said relative position, removable means for supporting said outer cover below said stays with a marginal portion of said cover extending beyond the edges of said stays, means for lowering and releasing said stays into position over said cover, means for turning said marginal portions and the corners of said cover over a marginal portion of said stays, said supporting means for said outer cover having means to position and hold said inner liner for registry with said outer cover sheet and stays in the relative position it occupies in the finished casing.

2. A machine according to claim 1, in which said raising means comprises a reciprocating head having gripping means for supporting said stays, said gripping means comprising vacuum cups seated in said head, and means to apply suction to said cups.

3. A machine according to claim 1, in which said raising means includes an annular member for pressure contact with said outer cover when lowered, and means for striking a blow over the corners of said turned over marginal portions of said outer cover, said annular member having corner sockets in alignment with the corners of said turned-over portions, said striking means being guided in said sockets.

4. A machine according to claim 1, in which said marginal portions of said cover sheet and the corners thereof are simultaneously turned over said stays, said turning means holding a marginal part of said portions clamped to said stays while said inner liner is applied to the remaining portions of said turned cover sheet.

5. A machine for making casings for books of the type having an outer cover sheet, an inner liner sheet, and stay members supported between them, in which a peripheral marginal portion of the cover sheet is turned over the edges of said stays, comprising in combination, a reciprocating head for raising said stay members prior to positioning them over said cover sheet during assembly, said reciprocating head comprising a pressure plate and a pressure member about said plate, said pressure member being independently movable with respect to said pressure plate, a jig having a well for supporting said cover sheet under said head in registry with said stays, said jig supporting the marginal portions of said cover sheet laterally beyond the edges of said stays, means for moving said head, including said pressure member, into said well to bring said stays into pressure contact with said cover sheet and to raise the marginal portion of said cover sheet to an upstanding position against the walls of said well, said moving means holding said pressure plate and pressure member in pressure contact with said stays in said jig, said pressure member pressing against the marginal portion of said stays around the pressure plate, means for raising said pressure member out of engagement with said marginal portion while said pressure plate is maintained in pressure contact with said stays, and means for turning said upstanding portions of said cover sheet over the upper marginal surface of said stays.

6. A machine according to claim 5, in which said last named means comprises arms movable into engagement with said upstanding portions to press them over said upper surface of said stays.

7. A machine according to claim 5, in which said last named means comprises arms slidable on said jig.

8. A machine according to claim 5, including means on said jig for gathering the corners of said cover sheet into pleats as said corners are raised to upstanding position, said turning means turning said pleated portions over said stays.

9. A machine according to claim 5, including means on said jig for gathering the corners of said cover sheet into pleats as said corners are raised to upstanding position, said turning means turning said pleated portions over said stays, and means for striking a blow over said pleated corners after they are turned over said stays.

10. Machine according to claim 5, including means on said jig for gathering the corners of said cover sheet into pleats as said corners are raised to upstanding position, said turning means turning said pleated portions over said stays, said gathering means comprising notches formed in the corners of the walls of said jig.

11. The method of making a casting for a book of the type having an outer cover sheet of thermoplastic material, an inner liner sheet, and stiffening stay members supported between them comprising the steps of supporting said stays in the relative positions they will assume in the finished product, lifting said stays simultaneously while maintaining their relative fixed positions, placing said outer cover sheet below said stays with a marginal portion of said sheet extending laterally beyond the edges of said stiffening members, lowering said stays into pressure contact with said cover sheet while maintaining the relative positions of said stays and cover sheet, raising and turning the marginal portions of said cover sheet and corners thereof over a marginal portion of the upper surface of said stays, striking the corners of said sheet a blow after said sheet is turned over the marginal surface of said stays, applying said inner liner sheet over said stays and over the turned-over marginal portions of said cover sheet, and bonding said liner to said cover sheet along their line of contact.

12. A machine for making casings for books of the kind having an outer cover, an inner liner, and stays supported between them, comprising means for supporting the said stays in the relative positions they will occupy in the finished casing, means for simultaneously raising said stays in said relative position, means for supporting said outer cover below said stays with a marginal portion of said cover extending beyond the edges of said stays, means for lowering said stays into position over said cover, including means for yieldably engaging the outer marginal peripheral portions of said cover between said cover supporting means and said yieldable means, as said stays are lowered into position over said cover, means for turning said marginal portions and the corners of said covers over a marginal portion of said stays, and means for withdrawing said yieldable engaging means from said marginal portions immediately prior to turning said portions.

13. A machine according to claim 12 in which said turning means comprises a member to position and hold said inner liner over said marginal portions of said cover and over said stays to support said inner liner for registry with said cover sheet and stays in the relative position it occupies in the finished casing.

14. A machine for making casings for books of the kind having an outer cover, an inner liner, and stays supported between them, comprising means for supporting said stays in the relative positions they will occupy in the finished casing, means for simultaneously raising said stays in said relative position, a removable jig for supporting said outer cover below said stays with a marginal portion of said cover extending beyond the edges of said stays, means for lowering said stays into position over said cover, slidable means on said jig for turning said marginal portions and the corners of said cover over a marginal portion of said stays and clamping said cover to said stays, leaving a portion of said turned part exposed, means independent of said jig for actuating said slidable means, said slidable means positioning and holding said inner liner for registry with said exposed portions of said outer cover sheet in the precise relative position it occupies in the finished casing.

15. A machine for making casings for books of the kind having an outer cover, an inner liner, and stays supported between them, comprising means for supporting said stays in the relative positions they will occupy in the finished casing, means for simultaneously raising said stays in said relative position, a removable jig for supporting said outer cover below said stays with a marginal portion of said cover extending beyond the edges of said stays, said raising means including an annular member for clamping engagement with said cover and stays, said annular member having means for yieldably clamping said marginal portions of said cover between said yieldable means and said jig, means on said jig for turning said marginal portions of said cover over the corners and edges of said stays and means for lowering said stays into said jig, said marginal portion of said cover being clamped between said yieldable means and said jig to stretch said cover as it is lowered into said jig.

16. In the method of making casings for books of the kind having an outer cover, an inner liner and stays supported between them, wherein the stays are arranged on the outer cover in the precise relative position they occupy in the finished casing and a marginal portion of said outer cover is turned over the corners and edges and folded over a marginal portion of said stays, and wherein said liner is then applied over said folded-over marginal portions of said cover, the step of striking the corners of said cover a blow before said liner is applied thereto.

17. In a machine for assembling casings for books, the casings comprising inner stays with an outer cover, with marginal portions of the cover being folded over the adjacent edges of the stays and overlapping the upper surfaces of the stays, the combination comprising a well for receiving said cover, means for lowering and holding the stays over the covers in said well in the relative positions they will occupy in the finished casing, means for yieldably clamping said marginal portions of said cover, before folding said portions, while said stays are being lowered thereon into the well to stretch said cover, means for releasing and removing said clamping means from said marginal portions and thereafter turning said portions over said stays while said stays are held over said cover by said lowering means.

18. A machine according to claim 17 in which said lowering and holding means comprises a reciprocating head and said clamping means comprises a member carried by said head and which is movable independently thereof about said head.

19. A machine according to claim 18 in which said reciprocating head includes a pressure plate for engagement with said stays, and said clamping means comprises a member disposed about the periphery of said plate.

20. The combination of claim 17 including means for striking a blow over the portions of said covers after the marginal edges of said covers have been turned over.

References Cited by the Examiner

UNITED STATES PATENTS

| | | | |
|---|---|---|---|
| 1,336,944 | 4/1920 | Dean | 11—2 |
| 1,640,918 | 8/1927 | Austin | 11—2 X |
| 1,705,394 | 3/1929 | Brennan | 11—2 |
| 2,758,631 | 8/1956 | Peterson et al. | 11—2 X |
| 3,128,484 | 4/1964 | Rogers et al. | 11—2 |

LAWRENCE CHARLES, *Primary Examiner.*